United States Patent
Meshaikhis et al.

(10) Patent No.: US 11,098,811 B2
(45) Date of Patent: Aug. 24, 2021

(54) BONNET VENT ATTACHMENT

(71) Applicant: Saudi Arabian Oil Company, Dhahran (SA)

(72) Inventors: Ali N. Meshaikhis, Qatif (SA); Luay H. Al-Awami, Qatif (SA); Mohammad R. Khunaizi, Dammam (SA)

(73) Assignee: Saudi Arabian Oil Company, Dhahran (SA)

( * ) Notice: Subject to any disclaimer, the term of this patent is extended or adjusted under 35 U.S.C. 154(b) by 51 days.

(21) Appl. No.: 16/287,710

(22) Filed: Feb. 27, 2019

(65) Prior Publication Data

US 2020/0271236 A1    Aug. 27, 2020

(51) Int. Cl.
| | |
|---|---|
| *F16K 37/00* | (2006.01) |
| *F16K 17/04* | (2006.01) |
| *F16K 41/10* | (2006.01) |
| *F16K 17/06* | (2006.01) |

(52) U.S. Cl.
CPC ............ *F16K 17/06* (2013.01); *F16K 17/048* (2013.01); *F16K 37/0025* (2013.01); *F16K 37/0083* (2013.01); *F16K 41/10* (2013.01)

(58) Field of Classification Search
CPC ......... Y10T 137/7878; Y10T 137/8326; F16K 17/06; F16K 37/0025; F16K 37/005; F16K 17/048; F16K 37/0083; F16K 41/10
USPC ........ 137/524, 557; 251/30.02, 30.03, 30.04, 251/30.05
See application file for complete search history.

(56) References Cited

U.S. PATENT DOCUMENTS

| | | | | |
|---|---|---|---|---|
| 2,353,191 A | * | 7/1944 | Samiran ................. | F16K 17/30 137/220 |
| 2,594,951 A | * | 4/1952 | Mancini ................. | F17D 5/005 137/505.11 |

(Continued)

FOREIGN PATENT DOCUMENTS

| | | |
|---|---|---|
| GB | 836387 | 6/1960 |
| JP | 2004321860 | 11/2004 |
| WO | 2013070805 | 5/2013 |

OTHER PUBLICATIONS

Process Safety Beacon, "Pressure-Relief Valvu Bonnets—To Plug or Not to Plug?" An ICHE Technology Alliance, Center for Chemical Process Safety, ioMosaic, May 2013, 1 pages.

(Continued)

*Primary Examiner* — William M McCalister
(74) *Attorney, Agent, or Firm* — Fish & Richardson P.C.

(57) ABSTRACT

A valve system includes a bellows-type pressure relief valve and an attachment assembly. The bellows-type pressure relief valve includes a main housing defining a main chamber, an inlet opening, and an outlet opening, a bonnet housing defining a bonnet chamber and a bonnet vent in the bonnet housing, and a bellows structure defining a bellows chamber fluidly connected to the bonnet chamber. The attachment assembly is coupled to the bonnet vent to selectively plug the bonnet vent. The attachment assembly include a coupling to couple to the bonnet vent, a pressure sensor to detect a pressure in the bonnet chamber, and a vent structure including a vent valve to selectively open in response to an applied force or in response to the pressure sensor detecting a pressure in the bonnet chamber reaching a pressure threshold.

22 Claims, 2 Drawing Sheets

(56) References Cited

U.S. PATENT DOCUMENTS

| | | | | |
|---|---|---|---|---|
| 2,691,773 A * | 10/1954 | Lichtenberger | ......... | F16K 37/00 340/605 |
| 2,878,828 A * | 3/1959 | Klafstad | ............. | F16K 17/0433 137/478 |
| 3,027,916 A * | 4/1962 | Smith | .................. | F16K 17/087 137/557 |
| 3,393,702 A * | 7/1968 | Ferrill | ................. | F16K 17/0433 137/536 |
| 3,702,142 A * | 11/1972 | Richardson | ........... | F16K 17/087 137/472 |
| 4,130,130 A * | 12/1978 | Stewart | .............. | F16K 17/0433 137/475 |
| 4,263,929 A * | 4/1981 | Kearney | ................. | F16K 17/16 137/557 |
| 4,270,560 A * | 6/1981 | Kearney | ................. | F16K 17/16 116/268 |
| 4,634,099 A * | 1/1987 | Danko | .................... | F16K 41/10 251/335.3 |
| 4,635,723 A | 1/1987 | Spivey | | |
| 4,961,441 A * | 10/1990 | Salter | ................ | G05D 16/2053 137/14 |
| 5,125,621 A * | 6/1992 | Parsons | .................... | E03D 3/06 251/30.03 |
| 5,341,839 A * | 8/1994 | Kobayashi | ................ | E03D 3/04 137/505.13 |
| 5,501,242 A * | 3/1996 | Coutts | ................ | F16K 17/0406 137/1 |
| 5,950,923 A * | 9/1999 | Fukano | .................... | B05B 1/28 222/571 |
| 6,029,903 A * | 2/2000 | Fukano | ............... | B05C 11/1026 222/571 |
| 6,981,553 B2 | 1/2006 | Stegemeier et al. | | |
| 7,445,163 B2 * | 11/2008 | Fukano | ................... | F16K 23/00 222/571 |
| 8,644,996 B2 * | 2/2014 | Inagaki | ............... | F16K 37/0066 700/287 |
| 8,955,821 B2 * | 2/2015 | Okuda | .................... | F16K 31/12 251/129.04 |
| 9,803,763 B2 | 10/2017 | Zikeli et al. | | |
| 2011/0001070 A1 * | 1/2011 | Wilke | ................. | F16K 37/0066 251/129.03 |
| 2011/0040501 A1 * | 2/2011 | Martin | ...................... | G01F 1/74 702/45 |
| 2012/0305262 A1 | 12/2012 | Ballard et al. | | |
| 2014/0048255 A1 * | 2/2014 | Baca | ...................... | E21B 34/02 166/250.1 |
| 2014/0238512 A1 * | 8/2014 | Bowers | ............... | F16K 37/0041 137/554 |
| 2017/0307095 A1 | 10/2017 | Wilson et al. | | |
| 2017/0314694 A1 | 11/2017 | Moro-Le Gall et al. | | |

OTHER PUBLICATIONS

PCT International Search Report and Written Opinion in International Appln. No. PCT/US/2020/019883, dated Jun. 4, 2020, 12 pages.

International Search Report and Written Opinion issued in International Application No. PCT/US2019/066576 dated Apr. 3, 2020, 13 pages.

* cited by examiner

BONNET VENT ATTACHMENT

TECHNICAL FIELD

This disclosure relates to valve systems, for example, pressure relief valves.

BACKGROUND

Pressure relief valves are used in process systems to relieve excess pressure in the process systems. There are many types of pressure relief valves, such as conventional spring-loaded relief valves, balanced-bellows relief valves, pilot-operated relief valves, and others. Some relief valves, such as conventional and balanced-bellows relief valves, include a vent on the valve bonnet. The vent is either plugged or unplugged. Balanced-bellows relief valves are normally used where the relief valve discharges to a closed system and the back pressure exceeds about 10% of a set opening pressure of the relief valve. Balanced-bellows relief valves are also used in fouling or dirty services, where pilot-operated valves cannot be used due to the possibility of plugging the pilot line. In operation, a bellows structure of the balanced-bellows relief valve protects a spring of the relief valve from process fluid.

SUMMARY

This disclosure describes valve systems with a pressure relief valve, such as a bellows-type pressure relief valve.

Some aspects of the disclosure encompass a valve system including a bellows-type pressure relief valve and an attachment assembly. The bellows-type pressure relief valve includes a main housing defining a main chamber, an inlet opening, and an outlet opening, a bonnet housing defining a bonnet chamber and a bonnet vent in the bonnet housing, and a bellows structure defining a bellows chamber fluidly connected to the bonnet chamber. The attachment assembly is coupled to the bonnet vent and selectively plugs the bonnet vent. The attachment assembly includes a coupling to couple to the bonnet vent, a pressure sensor to detect a pressure in the bonnet chamber, and a vent structure including a vent valve to selectively open in response to an applied force or in response to the pressure sensor detecting a pressure in the bonnet chamber reaching a pressure threshold.

This, and other aspects, can include one or more of the following features. The valve system of claim 1, where the attachment assembly comprises a transmitter connected to the pressure sensor, the transmitter configured to transmit a pressure signal from the pressure sensor. The transmitter can transmit the pressure signal from the pressure sensor in response to the pressure in the bonnet chamber reaching the pressure threshold. The valve system can further include an alarm system communicably connected to the transmitter, the alarm system to receive the pressure signal from the transmitter and activate in response to the pressure in the bonnet chamber reaching the pressure threshold. The transmitter can transmit the pressure signal to a control room. The pressure threshold can include a pressure between −1.5 pounds per square inch gauge (psig) and 5.0 psig. The attachment assembly can include a pressure gauge connected to the pressure sensor, the pressure gauge including a visible indication of the pressure in the bonnet chamber. The pressure gauge can include a dial indicating the pressure in the bonnet chamber. The vent valve of the vent structure can be a manual vent valve that selectively opens in response to the applied force. The vent structure can include an actuator to selectively open the vent valve in response to the pressure in the bonnet chamber reaching the pressure threshold. The vent structure can include a self-actuated pressure relief valve responsive to a pressure from the bonnet chamber. The bellows-type pressure relief valve can include a disc holder disposed within the main chamber and the bonnet chamber to selectively move in response to a fluid pressure at the inlet opening, the disc holder coupled to a sealing disc configured to engage with and selectively plug the inlet opening, and a guide structure mounted between the main housing and the bonnet housing, the guide structure to position the disc holder within the main chamber and the bonnet chamber and to at least partially fluidly separate the bonnet chamber and the main chamber, where the bellows structure is coupled to the guide structure at a first end of the bellows structure, and coupled to the disc holder at a second end of the bellows structure, the bellows structure surrounding a portion of the disc holder. The bellows-type pressure relief valve can include a spring to bias the disc holder and the sealing disc into sealing engagement with a portion of the main housing defining the inlet opening. The bellows-type pressure relief valve can include an adjustment mechanism coupled to the spring, the adjustment mechanism to adjust a set-pressure threshold of the disc holder in response to the fluid pressure at the inlet opening.

Certain aspects of the disclosure encompass a method that includes selectively plugging a bonnet vent of a bellows-type pressure relief valve with an attachment assembly connected to the bonnet vent. The bellows-type pressure relief valve includes a main housing having a main chamber, an inlet opening, and an outlet opening, a bonnet housing having a bonnet chamber and the bonnet vent in the bonnet housing, and a bellows structure defining a bellows chamber fluidly connected to the bonnet chamber. The method includes detecting, with a pressure sensor of the attachment assembly, a pressure in the bonnet chamber, and transmitting, with a transmitter connected to the pressure sensor, a pressure signal from the pressure sensor corresponding to the detected pressure in the bonnet chamber. This, and other aspects, can include one or more of the following features. The method can include determining, with a controller connected to the pressure sensor and the transmitter, that the detected pressure in the bonnet chamber is greater than a pressure threshold. Transmitting the pressure signal with the transmitter can include, in response to determining that the detected pressure in the bonnet chamber is greater than the pressure threshold, transmitting the pressure signal from the pressure sensor to an alarm system. The method can further include activating the alarm system in response to transmitting the pressure signal from the pressure sensor to the alarm system. The method can further include opening, in response to determining that the detected pressure in the bonnet chamber is greater than the pressure threshold, a vent valve of a vent structure of the attachment assembly. Opening a vent valve of a vent structure of the attachment assembly can include opening the vent valve with an actuator in response to the pressure in the bonnet chamber reaching the pressure threshold. Opening a vent valve of a vent structure of the attachment assembly can include opening the vent valve with an applied force. Transmitting a pressure signal with the transmitter can include transmitting the pressure signal from the pressure sensor to a control room. The method can include selectively opening a vent valve of a vent structure of the attachment assembly at regular intervals to vent pressure in the bonnet chamber to below a pressure threshold.

Certain aspects of the disclosure describe a plug assembly for a bellows-type pressure relief valve, the plug assembly including an attachment assembly to couple to a bonnet vent of a bellows-type pressure relief valve and selectively plug the bonnet vent. The attachment assembly can include a coupling to couple to the bonnet vent, a pressure sensor to detect a pressure at the bonnet vent, and a transmitter connected to the pressure sensor, the transmitter to transmit a pressure signal from the pressure sensor.

This, and other aspects, can include one or more of the following features. The attachment assembly can include a vent structure including a vent valve and an actuator, the actuator to selectively open the vent valve in response to the pressure at the bonnet vent reaching a pressure threshold. The attachment assembly can include a vent structure including a manual vent valve to selectively open in response to an applied force.

The details of one or more implementations of the subject matter described in this disclosure are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
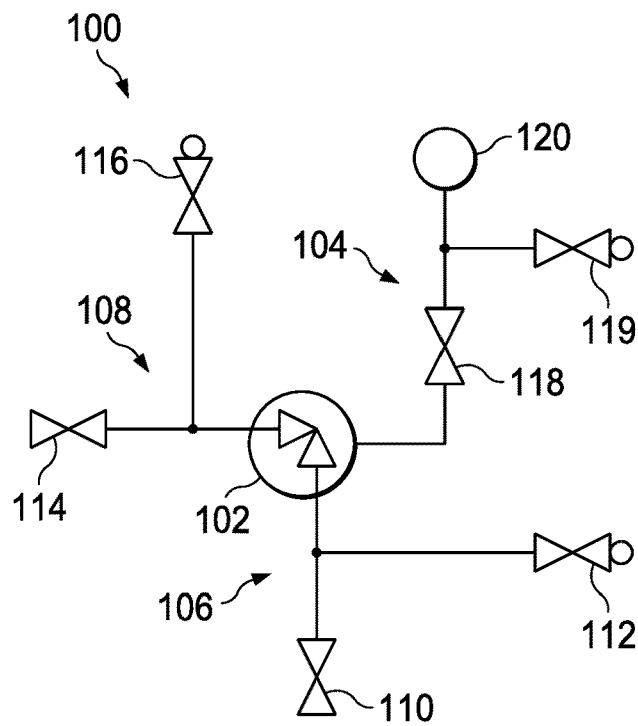
FIG. 1 is a partial schematic view of a valve system with a pressure relief valve and an attachment system.

This disclosure describes attachment assemblies for vents of relief valves, such as bonnet vents of bellows-type pressure relief valves. For example, an attachment assembly attaches to and plugs a bonnet vent of a bellows-type pressure relief valve, and includes a pressure gauge, a pressure sensor, transmitter, or a combination of these to measure and indicate a pressure at the bonnet vent. The bellows of a bellows-type pressure relief valve separates a main chamber of the pressure relief valve from a bonnet chamber of the pressure relief valve, and protects the spring and other components of the pressure relief valve bonnet from process fluid, especially when the fluid is corrosive or damaging. In some instances, an increase in pressure at the bonnet vent indicates a leak, rupture, or other type of failure of the bellows of a bellows-type pressure relief valve. The attachment assembly can connect to an alarm system positioned proximate to the bellows-type relief valve, in a control room, at another location, or a combination of these. The alarm system activates when the pressure gauge or pressure sensor measures an increase in pressure, for example, to a pressure greater than a pressure threshold. The pressure threshold represents the minimum pressure at the bonnet vent that signifies a leak, puncture, or other failure of the bellows. In some examples, the increase in pressure comes from a relatively higher downstream fluid pressure of the pressure relief valve that becomes exposed to the bonnet vent due to the leak, puncture, or other failure of the bellows, thereby increasing the pressure at the bonnet vent. The attachment assembly includes a vent structure, which can include a manual vent valve or an actively-controlled vent valve, for example, that opens in response to the pressure at the bonnet vent increasing above the pressure threshold.

In some industry standards, the bonnet vent of a bellows-type pressure relief valve is required to be unplugged. The intent behind this requirement is to keep the pressure in the bonnet of the bellows-type pressure relief valve near atmospheric pressure, since variation in the pressure in the bonnet can affect the opening pressure of the relief valve. In addition, other industry standards suggest or require connection of bonnet vents of bellows-type pressure relief valves to closed systems in order to contain any toxic, flammable, or otherwise undesirable release to the atmosphere. Adhering to these standards can be costly and difficult to implement. For example, implementing a closed system with a remote fluid storage tank required to be maintained near atmospheric pressure or connecting the bonnet vent to a flare header can be costly and difficult. In the present disclosure, an attachment assembly engages with a bonnet vent of a bellows-type relief valve to receive fluid through the bonnet vent, and includes a pressure gauge, pressure sensor, pressure transmitter, or a combination of these that connect to an alarm system, and a vent structure (for example, manual venting structure) that allows for selective opening of a vent valve of the attachment assembly. The attachment assembly can determine if the measured pressure is greater than the threshold pressure, and transmit the measured pressure to an alarm system, a control room, or both, in response to determining that the measured pressure exceeds the threshold pressure. The attachment assembly can provide for automatic detection of rupture, leak, or other failure of a bellows, visual indication of bonnet pressure to a field operator, manually controlled ventilation, automatic ventilation, or a combination of these features. The attachment assembly can reduce or eliminate associated safety risks of bonnet vents, for example, because the attachment assembly does not affect the main function of the pressure relief valve 202, and can maintain or improves the check on the mechanical integrity of a bellows of a pressure relief valve. Also, the attachment assembly satisfies the intent of industry codes and standards, for example, by mitigating the risk of dispersion or loss of containment in case of a bellows failure in a cost-effective way. In brief, the attachment assembly of the disclosure can be characterized by simplicity, low-cost, and satisfying the intent of all applicable industry standards.

FIG. 1 is a partial schematic view of an example valve system 100 that includes a pressure relief valve 102 and an attachment assembly 104 coupled to the pressure relief valve 102. The valve system 100 includes an upstream fluid conduit 106 that connects to an inlet of the pressure relief valve 102, and a downstream fluid conduit 108 that connects to an outlet of the pressure relief valve 102. The upstream fluid conduit 106 can be connected to equipment (not shown), such as process equipment or other source of pressurized fluid, while the downstream fluid conduit 108 can be connected to a flare header, a storage tank, a blowdown system, other pressure relieving systems or simply be venting to atmosphere. The upstream fluid conduit 106 provides fluid to the pressure relief valve 102 at an upstream pressure, which can vary during use. The pressure relief valve 102 acts to receive a pressurized fluid from the upstream fluid conduit 106, and if the received pressurized fluid from the upstream fluid conduit 106 is greater than a set opening pressure of the pressure relief valve 102, then the pressure relief valve 102 allows fluid flow to the downstream fluid conduit 108 to relieve pressure in the upstream fluid conduit 106.

The example valve system 100 can include a number of different valves to control and manage fluid flow through the valve system 100. For example, the example upstream fluid conduit 106 of FIG. 1 includes a first upstream block valve 110 and a second upstream vent valve 112, and the example downstream fluid conduit 108 includes a first downstream block valve 114 and a second downstream vent valve 116. However, the upstream fluid conduit 106 can include a different number of valves, such as none, one, or three or more valves, and the downstream fluid conduit 108 can include a different number of valves, such as none, one, or three or more valves.

The pressure relief valve can be a bellows-type pressure relief valve, such as a balanced-bellows relief valve.

The attachment assembly 104 attaches to the pressure relief valve 102 and measures a pressure within a chamber of the pressure relief valve 102. The attachment assembly 104 can be integral with a housing of the pressure relief valve 102, or can couple to the pressure relief valve 102, such as by threading, welding, or another type of coupling. The example attachment assembly 104 includes a block valve 118 that is normally open, a vent structure 119, and a sensor component 120. The vent structure 119 can include a vent valve, such as a manual vent valve responsive to an applied force, an actively controlled vent valve responsive to an actuator, a passive vent valve responsive to a pressure threshold or other characteristic, or another type of vent valve. The sensor component 120 can measure a pressure of fluid in the attachment assembly 104, which is fluidly connected to the chamber of the pressure relief valve 102. The sensor component 120 can take a variety of forms and include a variety of structures. For example, the sensor component 120 can include a pressure gauge, a pressure switch, a controller, a transmitter, an alarm system, a combination of these structures, or other structures. The sensor component 120 can measure a pressure in the chamber of the pressure relief valve 102, display the measured pressure on a pressure gauge, determine if the measured pressure is greater than a threshold pressure of the pressure relief valve 102, transmit the measured pressure to a receiver or other device at a proximate or remote location, such as a control room of the valve system, and activate an alarm in response to determining that the pressure is greater than the threshold pressure.

Figure 2:
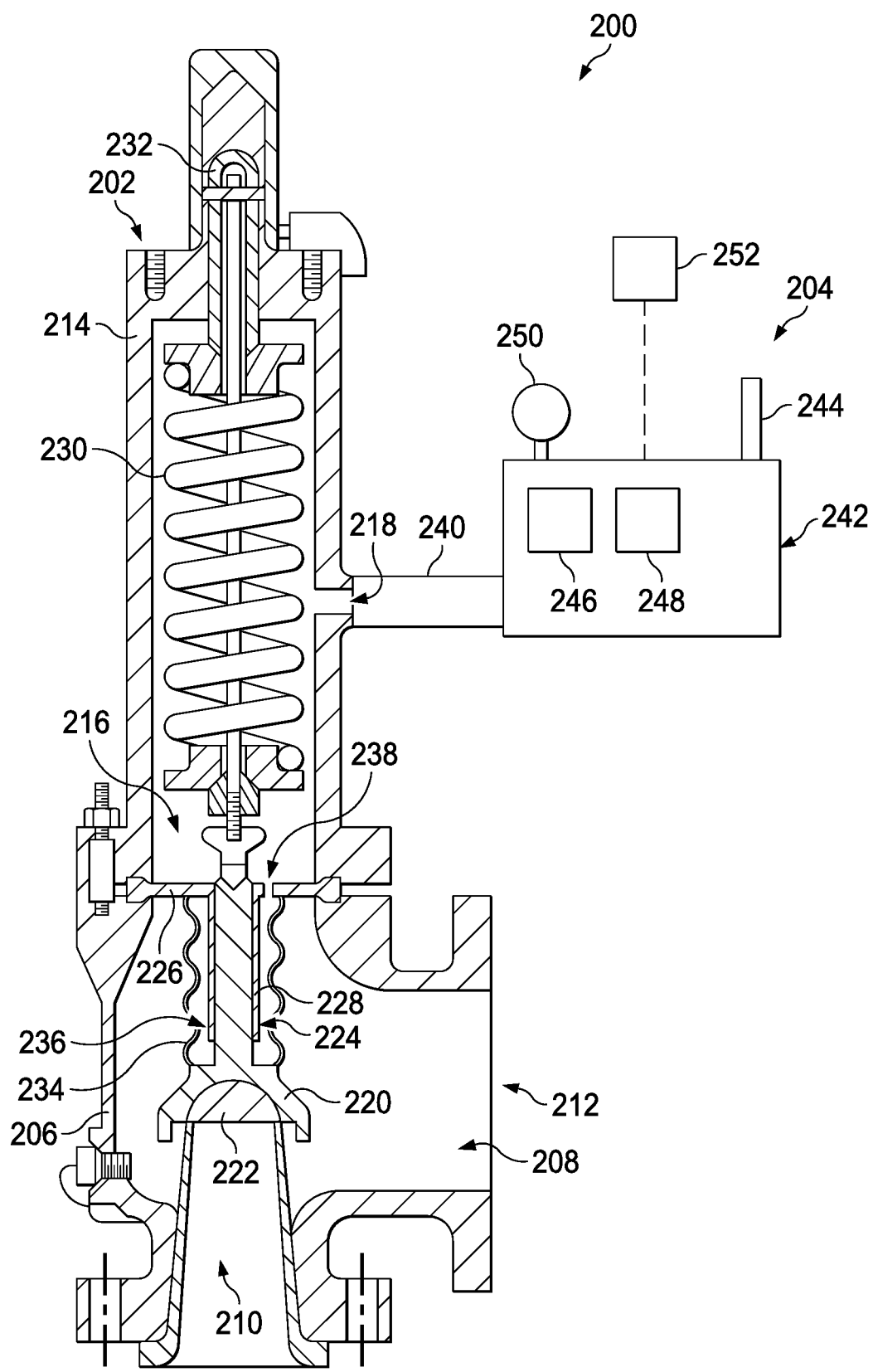
FIG. 2 is a partial schematic, partial cross-sectional front view of an example valve system with a pressure relief valve and an attachment system.

FIG. 2 is a partial schematic, cross-sectional front view of a valve system 200, including a pressure relief valve 202 and an attachment assembly 204. The valve system 200, pressure relief valve 202, and attachment assembly 204 can be used in the valve system 100, pressure relief valve 102, and attachment assembly 104 of FIG. 1. The example valve system 200 is similar to the valve system 100 of FIG. 1, except the example valve system 200 does not show an upstream fluid conduit or downstream fluid conduit.

The example pressure relief valve 202 of FIG. 2 is shown as a bellows-type pressure relief valve 202, for example, a balanced-bellows pressure relief valve. The pressure relief valve 202 includes a main housing 206 defining a main chamber 208, an inlet opening 210 fluidly connected to an upstream fluid, and an outlet opening 212 fluidly connected to a downstream location. The main housing 206 is shaped to provide an angled flow path from the inlet opening 210 to the outlet opening 212, for example, a ninety degree angle flow path. The pressure relief valve 202 also includes a bonnet housing 214 connected to the main housing 206 and defining a bonnet chamber 216. The bonnet housing 214 has a generally cylindrical shape, and couples to the main housing 206 at a location of the main housing 206 opposite the inlet opening 210. A bonnet vent 218 in the bonnet housing 214 allows ventilation of gas or other fluid out of the bonnet chamber 216. In the example pressure relief valve 202 of FIG. 2, the bonnet vent 218 includes an aperture in a wall of the bonnet housing 214.

The example pressure relief valve 202 includes a disc holder 220 disposed within the main chamber 208 and the bonnet chamber 216. The disc holder 220 extends within the main chamber 208 and the bonnet chamber 216 such that a first portion of the disc holder 220 is disposed generally within the bonnet chamber 216 and a second portion of the disc holder 220 is disposed generally within the main chamber 208. The disc holder 220 includes (for example, is coupled to or is integral with) a sealing disc 222 that engages with and selectively plugs the inlet opening 210. The disc holder 220 selectively moves, for example, translates, in response to fluid pressure at the inlet opening 210, where the fluid pressure applies a force against the sealing disc 222. If this force against the sealing disc 222 is greater than an opposing force that biases the disc holder 220 and sealing disc 222 into engagement with the inlet opening 210, then the disc holder 220 moves away from the inlet opening 210, the sealing disc 222 disengages from the inlet opening 210, and fluid is open to flow from the inlet opening 210 into the main chamber 208.

A guide structure 224 mounted between the main housing 206 and the bonnet housing 214 positions the disc holder 220 within the main chamber 208 and the bonnet chamber 216, and at least partially fluidly separates the bonnet chamber 216 and the main chamber 208. The shape of the guide structure 224 can vary. In the example pressure relief valve 202 of FIG. 2, the guide structure 224 includes a generally disc-shaped body portion 226 with a central aperture, and a generally cylindrical extension 228 extending from the body portion 226 about the aperture and toward the main chamber 208. The disc holder 220 extends through this aperture within the cylindrical extension 228, which guides the disc holder 220 along its path of linear translation.

The pressure relief valve 202 includes a spring 230 in the bonnet chamber 216 to bias the disc holder 220 and the sealing disc 222 into engagement with the portion of the main housing 206 defining the inlet opening 210. In some examples, the spring 230 is a coil spring that connects on a first end to the bonnet housing 214 and connects on a second end to the disc holder 220. The spring 230 provides a biasing force on the disc holder 220 toward the inlet opening 210 of the main housing 206. In some implementations, the pressure relief valve 202 includes an adjustment mechanism 232 coupled to the spring 230 to adjust a set-pressure threshold of the pressure relief valve 202. For example, the adjustment mechanism 232 can include an adjusting screw and a locknut that adjust the position of the first end of the spring 230, thereby adjusting the spring force that the spring 230 applies on the disc holder 220. This spring force at least partially defines the set-pressure threshold, which is the minimum pressure at the inlet opening 210 required to overcome the spring force against the disc holder 220 and move the disc holder 220 and sealing disc 222 out of sealing engagement with the inlet opening 210.

The example pressure relief valve 202 is a bellows-type pressure relief valve, and includes a bellows structure 234 at least partially separating the main chamber 208 from the bonnet chamber 216. The bellows structure 234 includes a generally tubular seal structure having ring-shaped convolutions along at least a portion of a tubular length of the seal structure. The bellows structure 234 is positioned concentrically about a portion of the disc holder 220, and connects to the guide structure 224 on a first end of the bellows structure 234 and connects to the disc holder 220 on a second end of the bellows structure 234. The bellows structure defines a bellows chamber 236 fluidly connected to the bonnet chamber 216, for example, by a fluid passageway 238 in the guide structure 224. The bellows structure 234 is flexible along its tubular length, for example, so that the bellows structure 234 can compress or expand as the disc holder 220 translates relative to the guide structure 224 or bonnet housing 214. The convolutions of the bellows structure 234 can contribute to the flexibility of the bellows structure 234, as can the material of the bellows structure 234. The bellows structure 234 can be made from a variety of materials, for example, metal, rubber, or other material. The bellows structure 234 separates the fluids in the main chamber 208 from infiltrating into the bonnet chamber 216, and separates the fluid pressure in the main chamber 208 from the fluid pressure in the bonnet chamber 216. For example, the fluids in the main chamber 208 can be caustic, toxic, or otherwise damaging to the components in within the bonnet chamber 216.

During operation of the pressure relief valve 202, the pressure in the bonnet chamber 216 is designed to be controlled, in that the pressure in the bonnet chamber 216 is designed to be maintained at a consistent pressure, such as at atmospheric pressure. For example, the pressure in the bonnet chamber 216 can affect the opening pressure of the pressure relief valve 202. Ventilation through the bonnet vent 218 counters pressure buildup in the bonnet chamber 216, for example, due to the compression of the bellows structure 234 and the spring structure 230 when the disc holder 220 lifts. In some implementations, the bellows structure 234 is prone to leakage, deformation, wear, rupture, or other failures. For example, repeated compression of the bellows structure 234 can damage the bellows structure 234. A failure of the bellows structure 234 can incapacitate the pressure relief valve 202, posing a danger to the overall valve system 200. A bellows failure can also render the relief valve 202 inoperable, or can change the opening pressure of the pressure relief valve 202 because of deformation or other failure of the bellows structure 234. In instances of bellows structure 234 failure, a pressure change in the bonnet chamber 216, such as at the bonnet vent 218, provides a measureable indication of failure of the bellows structure 234. The example attachment assembly 204 of FIG. 2 includes a bonnet vent nipple assembly that couples to the bonnet housing 214 at the bonnet vent 218 to selectively vent (or plug) the bonnet chamber 216 at the bonnet vent 218 and measure a fluid pressure at the bonnet vent 218, for example, to monitor for and determine a failure of the bellows structure 234.

The pressure at the bonnet vent 218 provides an indication of the status of the pressure relief valve 202, for example, the effectiveness of the seal between the main chamber 208 and the bonnet chamber 216. In the example valve system 200 of FIG. 2, the attachment assembly 204 allows for pressure monitoring, pressure indication, bellows failure detection, venting, or a combination of these. The attachment assembly 204 measures the pressure of the bonnet chamber 216 at the bonnet vent 218, and can determine if the measured pressure is greater than a threshold pressure. This pressure threshold is slightly above atmospheric pressure, for example, 1.5 to 2.0 PSIG. The threshold pressure indicates a leak or failure of the seal between the main chamber 208 and the bonnet chamber 216. For example, a measured pressure at the attachment assembly 204 that is at or above the pressure threshold can indicate a leak, rupture, or other type of failure of the bellows structure 234, which is configured to completely separate the fluid pressure in the main chamber 208 from the fluid pressure in the bonnet chamber 216. In instances of bellows failure, fluid pressure in the main chamber 208 (such as downstream pressure) is exposed to the bonnet chamber 216, thereby increasing the pressure at the bonnet vent 218 and the attachment assembly 204.

The pressure threshold can vary, for example, based on the downstream pressure at outlet opening 212. In some implementations, the pressure threshold is between 0.5 pounds per square inch gauge (psig) and 5.0 psig, and some instances the threshold could be between 0.5 and 1.5 psi vacuum.

The attachment assembly 204 is fluidly connected to the bonnet chamber 216 of the pressure relief valve 202 via the bonnet vent 218. In other words, the attachment assembly 204 is exposed to the fluid pressure in the bonnet chamber 216. The example attachment assembly 204 of FIG. 2 includes a coupling 240 to couple to the bonnet housing 214 through the bonnet vent 218, a sensor component 242 attached to the coupling 240 to sense a pressure in the attachment assembly 204, and a vent structure 244 to selectively vent fluid out of the attachment assembly 204. The coupling 240 can be integral with the bonnet housing 214, or can couple to the bonnet housing 214, for example, by threading, welding, or another type of coupling. The coupling 240 is connected to the bonnet vent 218 to monitor fluid pressure in the bonnet chamber 216. The coupling 240 can take a variety of forms. For example, the coupling 240 can include a nipple assembly, such as a threaded nipple coupled to a fluid conduit, or another type of coupling.

The vent structure 244 can include a vent valve that selectively opens to vent gas or other fluid from the attachment assembly 204. The vent valve can take a variety of forms. For example, the vent valve can include a manual block valve that is opened manually by an operator to ensure pressure in the bonnet chamber 216 is atmospheric, a self-actuated small relief valve responsive to an applied force, an actively controlled vent valve responsive to an actuator, a passive vent valve responsive to a pressure threshold or other characteristic of the vent structure 244, or another type of vent valve. In some examples, the vent valve of the vent structure 244 is a manual vent valve configured to be selectively opened in response to a pressure alarm or as a routine daily action by an operator. The manual vent valve can include a hand crank or hand valve, and the applied force can include a force applied by hand by an operator, or another manual force applied to the vent valve. In certain examples, the vent structure 244 includes an actuator that can actuate to open the vent valve, for example, in response to the pressure in the attachment assembly 204 (or bonnet chamber 216) reaching or exceeding the pressure threshold. The vent structure 244 can vent fluid pressure from the attachment assembly 204 to the atmosphere, to a closed system (such as a closed storage tank), for example, to mitigate any toxic or flammable release, or to another location.

The sensor component 242 of FIG. 2 includes a pressure sensor 246, a transmitter 248, and a pressure gauge 250. The pressure sensor 246 measures a pressure in the attachment assembly 204. The pressure gauge 250 measures the pressure and displays the measured pressure, for example, on a visible indicator, such as a pressure dial visible to the human eye. In some implementations, the pressure gauge 250 is connected to, or integral with, the pressure sensor 246. The transmitter 248 connects to either or both of the pressure sensor 246 or the pressure gauge 250. In some instances, the transmitter 248 includes a built-in sensor, so the transmitter 248 can replace or be redundant with the pressure sensor 246. The transmitter 248 transmits a pressure signal representative of the measured pressure (for example, from the pressure sensor 246 or from the transmitter 248 itself), or pressure gauge 250, to a component that can receive the pressure signal, such as a receiver in a control room, an alarm system, or another component. In some implementations, the transmitter 248 transmits the pressure signal from the pressure sensor 246 or pressure gauge 250 in response to the pressure in the attachment assembly 204 reaching the pressure threshold. For example, sensor component 242 can include a controller communicably connected to the transmitter 248, where the controller can compare a measured pressure to the pressure threshold, and determine if the measured pressure is less than, equal to, or greater than the pressure threshold. The controller can be separate from or integral with the transmitter 248.

In some implementations, the example valve system 100 includes an alarm system 252 communicably connected to the sensor component 242, for example, connected to the transmitter 248. The alarm system 252 receives the pressure signal from the transmitter 248, controller, pressure sensor 246, pressure gauge 250, or a combination of these features, and can activate in response to the pressure in the attachment assembly 204 reaching or exceeding the pressure threshold.

In some implementations, the sensor component 242 includes additional components, different components, or fewer components than the example sensor component 242 shown in FIG. 2. For example, the sensor component 242 can include the controller, or exclude one or more of the pressure sensor 246, transmitter 248, or pressure gauge 250. In some examples, the sensor component 242 includes either the pressure sensor 246 or the pressure gauge 250, where the transmitter 248 is connected to either of the pressure sensor 246 or the pressure gauge 250.

The attachment assembly 204 connects to the bonnet housing 214, and receives and measures the pressure in the bonnet chamber 216 with the pressure sensor 246, the pressure gauge 250, or both. The attachment assembly 204 also determines if the measured pressure is greater than the threshold pressure, and transmits the measured pressure with the transmitter 248 to a receiver or other device at a proximate or remote location from the attachment assembly 204, for example, in response to determining that the measured pressure exceeds the threshold pressure. The receiver or other device can include the control room, the alarm system 252, or other equipment. In some implementations, the pressure gauge 250 can be visibly checked by a field operator, or the pressure signal can be automatically transmitted to the alarm system 252 connected to the operations control room. In instances of a bellows leak or rupture, the pressure transmitter 248 indicates and transmits a higher pressure, and the alarm system 252 can activate to indicate the leak or other fault in the pressure relief valve 202. The attachment assembly 204 can reduce or eliminate associated safety risks of bonnet vents. For example, the attachment assembly 204 does not affect the main function of the pressure relief valve 202, and maintains or improves the check on the mechanical integrity of the bellows structure 234 of the pressure relief valve 202.

Figure 3:
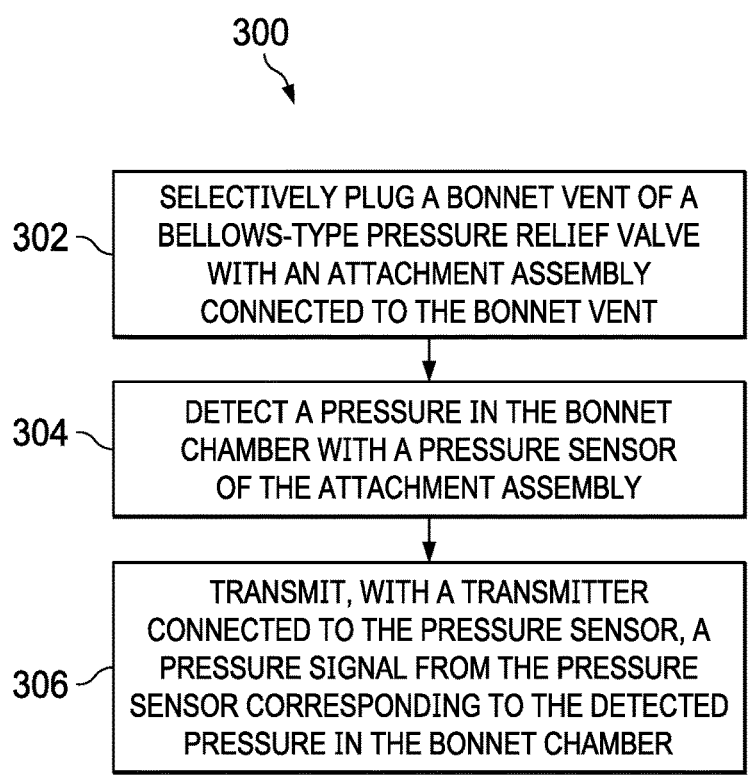
FIG. 3 is a flowchart describing an example method for measuring pressure at a bonnet vent of a pressure relief valve.

FIG. 3 is a flowchart describing an example method for measuring pressure at a bonnet vent of a pressure relief valve, for example, performed by the example valve system 100 of FIG. 1 or the example valve system 200 of FIG. 2. At 302, an attachment assembly plugs a bonnet vent of a bellows-type pressure relief valve, with the attachment assembly connected to the bonnet vent. The bellows-type pressure relief valve includes a main housing having a main chamber, an inlet opening, and an outlet opening, a bonnet housing having a bonnet chamber and the bonnet vent in the bonnet housing, and a bellows structure defining a bellows chamber fluidly connected to the bonnet chamber. At 304, a pressure sensor of the attachment assembly detects a pressure in the bonnet chamber. At 306, a transmitter connected to the pressure sensor transmits a pressure signal from the pressure sensor corresponding to the detected pressure in the bonnet chamber. In some implementations, a controller connects to the pressure sensor and determines that the detected pressure in the bonnet chamber is greater than a pressure threshold. The controller can be connected to or integral with the transmitter. The transmitter can transmit the pressure signal to an alarm system, which can activate in response to receiving the transmitted pressure signal corresponding to a pressure greater than the pressure threshold. In some examples, a vent structure of the attachment assembly opens to vent a fluid pressure in the attachment assembly to the atmosphere or to a closed system. A field operator can manually open this vent structure by a manually applied force, or the vent structure can be actively opened, for example, by an actuator.

A number of implementations have been described. Nevertheless, it will be understood that various modifications may be made without departing from the spirit and scope of the disclosure.

What is claimed is:

1. A valve system, comprising:
a bellows-type pressure relief valve comprising:
a main housing defining a main chamber, an inlet opening, and an outlet opening;
a bonnet housing defining a bonnet chamber and a bonnet vent in the bonnet housing; and
a bellows structure defining a bellows chamber fluidly connected to the bonnet chamber; and
an attachment assembly coupled to the bonnet vent to selectively plug the bonnet vent, the attachment assembly comprising:
a coupling coupled to the bonnet vent;
a pressure sensor to detect a pressure in the bonnet chamber; and
a vent structure comprising a vent valve configured to close in response to the pressure sensor detecting a pressure in the bonnet chamber exceeding a pressure threshold indicative of a failure of the bellows structure.

2. The valve system of claim 1, where the attachment assembly comprises a transmitter connected to the pressure sensor, the transmitter configured to transmit a pressure signal from the pressure sensor.

3. The valve system of claim 2, wherein the transmitter is configured to transmit the pressure signal from the pressure sensor in response to the pressure in the bonnet chamber exceeding the pressure threshold.

4. The valve system of claim 3, further comprising an alarm system communicably connected to the transmitter, the alarm system configured to receive the pressure signal from the transmitter and activate in response to the pressure in the bonnet chamber exceeding the pressure threshold.

5. The valve system of claim 2, wherein the transmitter is configured to transmit the pressure signal to a control room.

6. The valve system of claim 1, wherein the pressure threshold comprises a pressure between −1.5 pounds per square inch gauge (psig) and 5.0 psig.

7. The valve system of claim 1, where the attachment assembly comprises a pressure gauge connected to the pressure sensor, the pressure gauge comprising a visible indication of the pressure in the bonnet chamber.

8. The valve system of claim 7, wherein the pressure gauge comprises a dial indicating the pressure in the bonnet chamber.

9. The valve system of claim 1, wherein the vent structure comprises an actuator to close the vent valve in response to the pressure in the bonnet chamber exceeding the pressure threshold.

10. The valve system of claim 1, wherein the vent structure comprises a self-actuated pressure relief valve responsive to a pressure from the bonnet chamber.

11. The valve system of claim 1, where the bellows-type pressure relief valve comprises:
  a disc holder disposed within the main chamber and the bonnet chamber and configured to selectively move in response to a fluid pressure at the inlet opening, the disc holder coupled to a sealing disc configured to engage with and selectively plug the inlet opening; and
  a guide structure mounted between the main housing and the bonnet housing, the guide structure configured to position the disc holder within the main chamber and the bonnet chamber and to at least partially fluidly separate the bonnet chamber and the main chamber;
  wherein the bellows structure is coupled to the guide structure at a first end of the bellows structure, and coupled to the disc holder at a second end of the bellows structure, the bellows structure surrounding a portion of the disc holder.

12. The valve system of claim 11, where the bellows-type pressure relief valve comprises a spring to bias the disc holder and the sealing disc into sealing engagement with a portion of the main housing defining the inlet opening.

13. The valve system of claim 12, where the bellows-type pressure relief valve comprises an adjustment mechanism coupled to the spring, the adjustment mechanism configured to adjust a set-pressure threshold of the disc holder in response to the fluid pressure at the inlet opening.

14. A method, comprising:
  selectively plugging a bonnet vent of a bellows-type pressure relief valve with an attachment assembly connected to the bonnet vent, the bellows-type pressure relief valve comprising a main housing having a main chamber, an inlet opening, and an outlet opening, a bonnet housing having a bonnet chamber and the bonnet vent in the bonnet housing, and a bellows structure defining a bellows chamber fluidly connected to the bonnet chamber;
  detecting, with a pressure sensor of the attachment assembly, a pressure in the bonnet chamber exceeding a pressure threshold indicative of a failure of the bellows structure;
  transmitting, with a transmitter connected to the pressure sensor, a pressure signal from the pressure sensor corresponding to the detected pressure in the bonnet chamber; and
  closing a vent valve of a vent structure of the attachment assembly in response to detecting the pressure in the bonnet chamber exceeding the pressure threshold.

15. The method of claim 14, comprising determining, with a controller connected to the pressure sensor and the transmitter, that the detected pressure in the bonnet chamber exceeds the pressure threshold.

16. The method of claim 15, wherein transmitting the pressure signal with the transmitter comprises, in response to determining that the detected pressure in the bonnet chamber exceeds the pressure threshold, transmitting the pressure signal from the pressure sensor to an alarm system, the method further comprising:
  activating the alarm system in response to transmitting the pressure signal from the pressure sensor to the alarm system.

17. The method of claim 15, wherein closing the vent valve of the vent structure of the attachment assembly comprises closing the vent valve with an actuator in response to the pressure in the bonnet chamber reaching the pressure threshold.

18. The method of claim 14, wherein transmitting a pressure signal with the transmitter comprises transmitting the pressure signal from the pressure sensor to a control room.

19. The method of claim 14, comprising selectively opening the vent valve of the vent structure of the attachment assembly at regular intervals to vent the pressure in the bonnet chamber to below the pressure threshold.

20. The method of claim 14, wherein detecting the pressure in the bonnet chamber exceeding the pressure threshold indicative of a failure of the bellows structure comprises detecting the pressure in the bonnet chamber exceeding 1.5 psig.

21. The method of claim 20, wherein detecting the pressure in the bonnet chamber exceeding the pressure threshold indicative of a failure of the bellows structure comprises detecting the pressure in the bonnet chamber exceeding 2.0 psig.

22. The valve system of claim 1, wherein the pressure threshold comprises a pressure at or between 1.5 psig to 2.0 psig.

* * * * *